(12) United States Patent
Kearney (10) Patent No.: US 8,152,069 B2
(45) Date of Patent: Apr. 10, 2012

(54) DUAL FOCUS IMAGING BASED SYMBOLOGY READING SYSTEM

(75) Inventor: Sean P. Kearney, Marlton, NJ (US)

(73) Assignee: Metrologic Instruments, Inc., Blackwood, NJ (US)

( * ) Notice: Subject to any disclaimer, the term of this patent is extended or adjusted under 35 U.S.C. 154(b) by 1029 days.

(21) Appl. No.: 11/966,252

(22) Filed: Dec. 28, 2007

(65) Prior Publication Data

US 2009/0168117 A1 Jul. 2, 2009

(51) Int. Cl.
*G06K 7/10* (2006.01)
*G08C 21/00* (2006.01)

(52) U.S. Cl. ............. 235/462.06; 235/462.01; 235/454; 235/455

(58) Field of Classification Search ............. 235/462.06, 235/462.08, 462.25, 455, 462.21, 454, 462.01
See application file for complete search history.

(56) References Cited

U.S. PATENT DOCUMENTS

| | | |
|---|---|---|
| 5,326,962 A | 7/1994 | Peng |
| 5,629,995 A | 5/1997 | Duck et al. |
| 5,770,847 A | 6/1998 | Olmstead |
| 5,770,848 A | 6/1998 | Oizumi et al. |
| 6,066,857 A | 5/2000 | Fantone et al. |
| 6,301,061 B1 | 10/2001 | Lin |
| 6,621,063 B2 | 9/2003 | McQueen |
| 6,661,521 B1 | 12/2003 | Stern |
| 6,807,295 B1 | 10/2004 | Ono |
| 6,905,071 B2 | 6/2005 | Schmidt et al. |
| 7,073,715 B2 | 7/2006 | Patel et al. |
| 7,075,687 B2 * | 7/2006 | Lippert et al. ............. 359/204.1 |
| 7,082,001 B2 | 7/2006 | Vizgaitis |
| 7,106,902 B2 | 9/2006 | Nakazawa et al. |
| 7,201,321 B2 * | 4/2007 | He et al. ...................... 235/462.2 |
| 7,256,874 B2 * | 8/2007 | Csulits et al. ................... 356/71 |
| 7,573,654 B2 | 8/2009 | Bietry et al. |
| 7,579,577 B2 | 8/2009 | Ono |
| 7,623,177 B2 | 11/2009 | Nakamura et al. |
| 7,634,129 B2 | 12/2009 | Strom |
| 7,684,687 B2 | 3/2010 | Furuya |
| 2002/0139920 A1 * | 10/2002 | Seibel et al. ............... 250/208.1 |
| 2003/0020814 A1 | 1/2003 | Ono |
| 2004/0001035 A1 | 1/2004 | Awamoto et al. |
| 2004/0108380 A1 * | 6/2004 | Tseng et al. ................... 235/454 |

(Continued)

FOREIGN PATENT DOCUMENTS

EP 0516927 A2 3/1992

(Continued)

*Primary Examiner* — Edwyn Labaze
(74) *Attorney, Agent, or Firm* — Thomas J. Perkowski, Esq., P.C.

(57) ABSTRACT

A dual focus imaging scanner system and method for reading symbologies such as barcodes. The scanner system includes a light source producing two discrete wavelengths of light for illuminating a symbology target, a lens assembly for collecting a reflected image of the illuminated symbology target, which image preferably comprises the first and second wavelengths of light, and a color separation filter positioned to receive the combined reflected symbology target image from the lens assembly. The filter produces a first symbology image comprised of the first wavelength of light and a separate second symbology image comprised of the second wavelength of light. A first image sensor is positioned for receiving the first image and a second image sensor is positioned for receiving the second image. Preferably, the first and second sensors each have a different local point and focal range to scan near and far symbologies.

21 Claims, 5 Drawing Sheets

U.S. PATENT DOCUMENTS

| | | |
|---|---|---|
| 2005/0067494 A1 | 3/2005 | Ito et al. |
| 2006/0094048 A1 | 5/2006 | Lennhoff et al. |
| 2006/0186205 A1 | 8/2006 | Page |
| 2006/0255147 A1 | 11/2006 | Havens et al. |
| 2006/0289653 A1* | 12/2006 | Wittenberg et al. ..... 235/462.37 |
| 2007/0012781 A1 | 1/2007 | Heinrich |
| 2007/0114286 A1 | 5/2007 | Oliva et al. |

FOREIGN PATENT DOCUMENTS

| | | |
|---|---|---|
| EP | 0910032 A2 | 4/1999 |
| WO | WO 02/076082 A1 | 9/2002 |

* cited by examiner

DUAL FOCUS IMAGING BASED SYMBOLOGY READING SYSTEM

FIELD OF THE INVENTION

The present invention relates to symbology scanning systems, and more particularly to an imaging type scanner suitable for use with barcodes and other symbologies.

BACKGROUND

The use of symbologies for embedding information has enhanced the ability to track and manage personal product-related, and other data. One such symbology in common use today is the barcode. Barcode readers or scanners are found in many commercial environments such as, for example, point-of-sale stations in retail stores and supermarkets, inventory and document tracking, and diverse data control applications. To meet the growing demands, barcode symbol readers of various types have been developed for scanning and decoding barcode symbol patterns and producing symbol character data for use as input in automated data processing systems. Bar code scanners are generally available in a multitude of configurations such as compact portable hand-held formats and larger stationary hands-free and in-counter formats.

One type of barcode reader or scanner is an optical imaging scanner. In contrast to laser scanners which passes a laser beam across a barcode in a linear fashion, optical imaging scanners function in the same general manner as a digital camera and capture an image of the entire barcode at once. Imaging scanner systems include an image capture sensor, which may be a linear sensor (e.g. 1 row of 2500 image pixels) or a pixilated full array or area type sensor (e.g. 1280×960 pixels) such as a solid state CCD or CMOS. While linear sensors may be satisfactory for reading 1D or possibly PDF codes, area sensors are particularly suited for reading higher density 1D linear symbologies (e.g. 7 mil and below) and more complex 2D symbologies such as stacked PDF linear barcodes and matrix-type codes.

In using optical imaging scanners, a barcode or other symbology to be read is illuminated by a light source. The reflected light is then collected by a lens system and focused onto an image sensor such as a CCD, CMOS, or other similar solid state devices that may be used to capture visual images. The sensor essentially converts sensed or received light energy from the scanned image into electrical signals to create a digitized representation of the scanned symbology image. The signals are transmitted to and further processed by a microprocessor-based computer system that decodes the read symbol and performs other functions related to the data about the decoded symbol.

Optical imaging scanners may use fixed focus lenses or variable focus lenses having mechanically movable lens components that are mechanically adjusted by the camera control system to focus on a symbology. In some applications, fixed focus lens camera or imager scanners are preferred due to their advantageous ability to rapidly acquire images by eliminating time required by variable focus lenses to be mechanically adjusted to bring an image into focus. In addition, by eliminating the mechanically moving lens parts found in variable focus lenses, fixed lenses provide greater reliability than their variable focus counterparts.

Current fixed focus camera or imager system designs, however, are optimized for either long range (large depth of field or "DOF") or short range (small DOF) imaging. Within the application of data capture and collection, the choice of optimization is based on the application needs. High density symbologies (e.g., high density 1-D codes and 2D barcodes or matrix codes) require a focus relatively close to the camera to capture high resolution (dpi) images of high density symbologies which can be properly read. However, fixing the focus close to the camera limits the depth of field (DOF) and sacrifices the camera's ability to acquire images at farther distances. For those applications such as scanning linear 1D and 2D barcodes that may be read at relatively long ranges, the camera should focused far into the field. Unfortunately, this forfeits the camera's ability to image closer high density symbologies. Accordingly, the foregoing competing interests heretofore prevented a conventional fixed focus camera design that provides both long range and short range focusing due to the optical limitations discussed above.

An improved optical imaging scanner system for fixed lens setups is desired.

SUMMARY

A dual focus optical imaging scanner system with fixed lens set is provided. In one embodiment, the imaging scanner system includes two imaging sensors and two wavelengths of illumination for capturing symbologies such as barcodes at short and long ranges. Preferably, each image sensor has a different focal distance and range to provide near and far range scanning capabilities for reading symbologies.

According to one embodiment, a dual focus optical imaging scanner system for reading symbologies includes: a first light source producing a first discrete wavelength of light for illuminating a symbology target; a second light source producing a second discrete wavelength of light for illuminating the symbology target; a lens assembly for collecting a combined reflected image of the illuminated symbology target that comprises the first and second wavelengths of light; a color separation filter positioned to receive the combined reflected symbology target image from the lens assembly, the filter being operative to produce a first symbology image comprised of the first wavelength of light and a separate second symbology image comprised of the second wavelength of light; a first image sensor for receiving the first image comprised of the first wavelength of light from the filter and having an associated first focal point; and a second image sensor for receiving the second image comprised of the second wavelength of light from the filter and having an associated second focal point different than the first focal point; wherein the optical imaging scanner system has two different focal points for capturing near and far symbology images. In one embodiment, the symbology may be a barcode.

According to another embodiment, a dual focus optical imaging scanner system for reading symbologies includes: a first light source producing a first discrete wavelength of light for illuminating a symbology target; a second light source producing a second discrete wavelength of light for illuminating the symbology target; a fixed lens assembly for collecting a symbology image reflected from the illuminated target that comprises the first and second wavelengths of light, the lens assembly defining an optical axis; and a color separation filter positioned along the optical axis to receive the symbology image from the lens assembly, the filter oriented at an angle to the optical axis and being operative to: (1) reflect a symbology image comprised of the first wavelength of light from the filter to an off-axis image sensor, and to (2) transmit a separate symbology image comprised of the second wavelength of light through the filter to an on-axis image sensor; wherein the off-axis and on-axis image sensors have different focal lengths for capturing near and far symbologies. In one embodiment, the symbology may be a barcode.

According to one embodiment, a method for resolving a symbology with an imaging scanner system includes: illuminating a symbology with two discrete wavelengths of light; collecting an image of the illuminated symbology comprised of the two wavelengths of light; separating the collected image into a first symbology image comprised of the first wavelength of light and a second symbology image comprised of the second wavelength of light; receiving the first symbology image on a first image sensor having a first focal range; receiving the second symbology image on a second image sensor having a second focal range different than the first focal range; and resolving at least one of the first or second symbology images for decoding the symbology. In one embodiment, the symbology may be a barcode.

BRIEF DESCRIPTION OF THE DRAWINGS

The features of the preferred embodiments will be described with reference to the following drawings where like elements are labeled similarly, and in which.

All drawings are schematic and not actual physical representations of the components or systems described herein, and are further not drawn to scale. The drawings should be interpreted accordingly.

DETAILED DESCRIPTION

This description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "affixed," "connected" and "interconnected," refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the preferred embodiments. Accordingly, the invention expressly should not be limited to such preferred embodiments illustrating some possible non-limiting combination of features that may exist alone or in other combinations of features; the scope of the invention being defined by the claims appended hereto.

According to a preferred embodiment, a dual focus optical imaging scanner system with fixed focus lens assembly utilizes two imaging sensors and two wavelengths of illumination. This provides the ability to focus at short and long ranges simultaneously to capture symbologies image both short range high density and long range symbologies. The preferred embodiment can be constructed as a simple scan engine for use on its own or installed into a handheld presentation device such as a barcode scanner. In some embodiments, the preferred imaging scanner system may be mounted in a stationary hands-tree scanner format such as a an in-counter type design.

Figure 1:
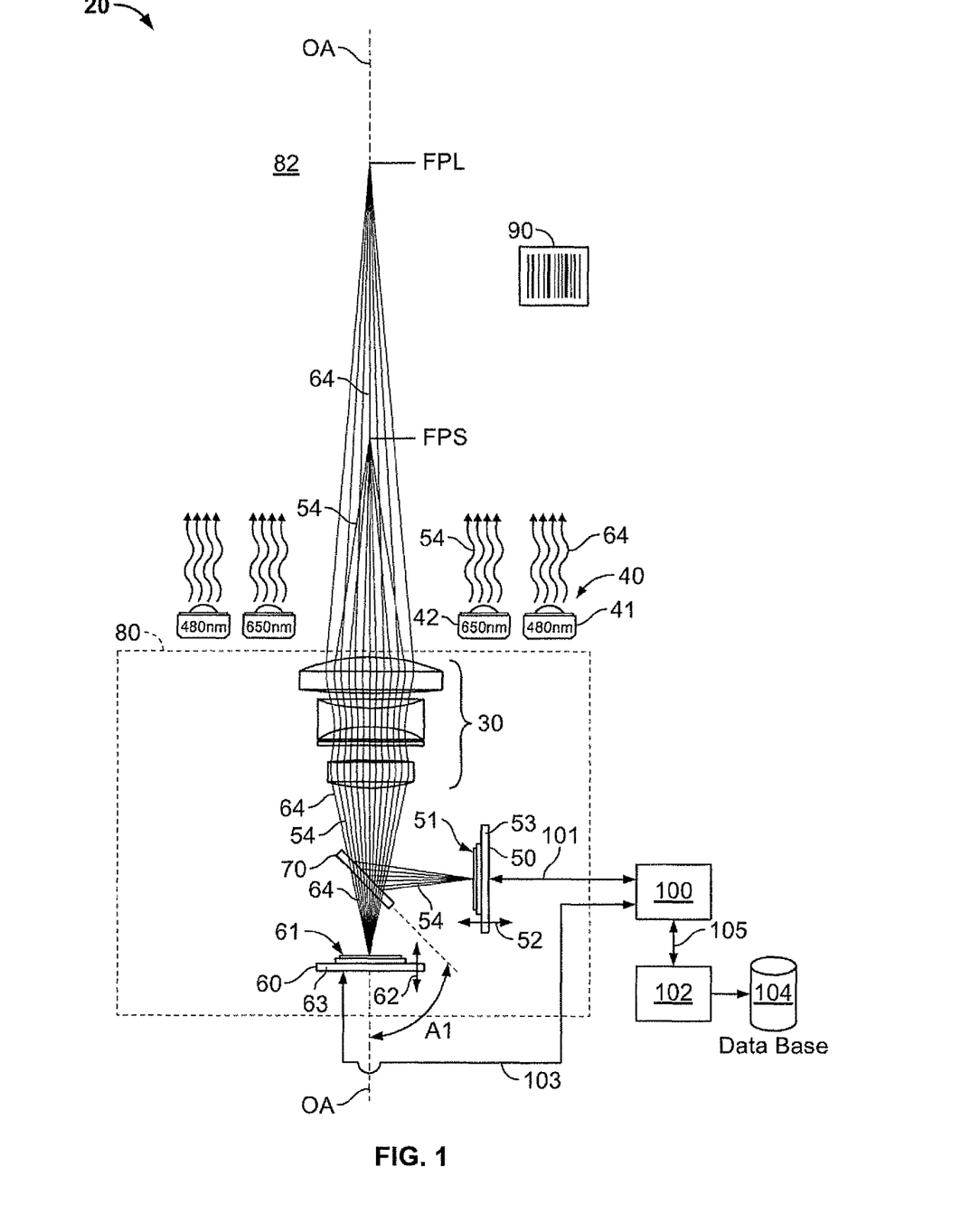
FIG. 1 is a schematic diagram of a preferred embodiment of a fixed lens optical imaging scanner system according to principles of the present invention.

FIG. 1 depicts a schematic diagram or a dual focus optical imaging scanner system 20 according to principle of the present invention. Imaging scanner system 20 generally includes a fixed focus optical lens set or assembly 30 mounted on an optical bench 80, a lighting system 40 for illuminating a target field 82 of the scanner system containing a symbology target 90 such as a barcode therein, a color separation filter such as Dichroic filter 70 for separating discrete wavelengths or colors of light, a first image sensor 50, and a second image sensor 60. Optical bench 80 may be a printed circuit board (PCB) mounted in a stationary fixed mount or portable handheld scanner. Lens assembly 30 defines an optical axis OA and may be any commercially-available camera lens design having any numbers and/or types of lenses. Although a triplet lens design is shown in one possible exemplary embodiment, any number of lenses such as single, double, or other may be used depending on the requirements of the intended application. Accordingly, the invention is not limited to triplet lens sets as shown.

In a preferred embodiment, dual focus imaging scanner system 20 including imaging control circuitry is small enough to fit into a housing that is sized and configured for being held in the hand. In one embodiment, the housing forms part of a handheld scanner that may be used to read barcodes. In other embodiments, the imaging system may be incorporated into a stationary fixed mount scanner.

In a preferred embodiment, lighting system 40 is a dual illumination system including first and second light sources 41 and 42 for illuminating the target field 82 and symbology target 90 therein. In one embodiment, light sources 41, 42 preferably produce two different and discrete or exclusive wavelengths or colors of light. Preferably, the wavelengths or colors of light produced by lighting system 40 are capable of being readily distinguished from each other for separation to support short and far focus functionality as further described herein. In the preferred embodiment, first light source 41 preferably may produce only blue light 64 with a representative wavelength of about 480 nm (nanometers). In one embodiment, the blue light 64 may be used for long range focus. In the preferred embodiment, second light source 42 may preferably produce only red light 54 with a representative wavelength of about 650 nm. In one embodiment, the red light 54 may be used for short range focus for high density symbologies. Red and blue light are preferably used in the preferred embodiment because they are distinct enough in the spectrum of colors to be amendable to effective separation through light filtering devices such as Dichroic filter 70. Dichroic filter 70 selectively separates out a color of light from the incident light energy received thereon (e.g. from a symbology target as captured by lens assembly 30) for providing a dual focus imaging capabilities as further described herein. It will be appreciated by those skilled in the art that other illumination schemes using other combinations of different wavelength or color light selected from the spectrum of colors including violet, indigo, blue, green, yellow, orange, red, and any colors in between may be used so long as the colors selected may be separated by Dichroic filter 70 as further described herein.

In a preferred embodiment, light sources 41 and 42 may be provided by LEDs. Any number of light sources 41, 42 may be used as necessary to adequately illuminate the target field 82 so that a symbology target 90 positioned therein can be imaged by imaging system 20 and subsequently decoded by the scanner. Light sources 41, 42 preferably may be physically located adjacent to lens assembly 30 in the scanner housing in one embodiment. In other embodiments, however, light sources 41, 42 may be located at other positions depending on the intended scanner design.

Dichroic filter 70 is a color separation filter that is operative to separate discrete wavelengths or colors from a beam of light. In one embodiment, Dichroic filter 70 is preferably a reflective type color filter having a thin filter substrate that when oriented at an angle to the optical axis along which light is transmitted, will reflect a discreet band of light wavelengths at an angle to the optical axis OA while transmitting other wavelengths of light through the filter along and parallel to the optical axis OA. Dichroic filter 70 is operative to direct the incident beam of light received thereon that includes both red and blue wavelengths 64, 54 from illuminated symbology target 90 towards either image sensors 50 and 60 depending on the wavelength of light received. In a preferred embodiment, Dichroic filter 70 may be a 45 degree, red reflective filter that is mounted to optical bench 80 at a 45 degree angle as shown in FIG. 1. Filter 70 therefore is operative to reflect red light 54 received at a 45 degree angle of incidence away at 90 degrees to optical axis OA to image sensor 50 (which in one embodiment may be used for short focus), while transmitting blue light 64 directly through the filter to image sensor 60 (which in one embodiment may be used for long focus). Dichroic filter 70 preferably is positioned along optical axis OA behind lens assembly 30 as shown in FIG. 1 to receive light reflected from symbology target 90. Dichroic filter 70 may be any commercially-available filter such as those supplied by Andover Corporation of Salem, N.H. or other manufacturers.

Although a 45 degree red reflective type filter may be used in a the preferred embodiment, it will be appreciated that other color Dichroic filters may alternatively be used depending on the combination of colored light selected for use from the spectrum of colors and which particular light is intended to be intercepted and rejected by the filter. Accordingly, in other possible embodiments, a 45 degree Dichroic blue filter may be used with the preferred embodiment to pass red light through to image sensor 60 while removing and reflecting blue light to image sensor 50. In still other possible embodiments, yellow Dichroic filters may be used in combination with blue or red light sources. Accordingly, the invention is not limited to the use of a red reflective type Dichroic filters and any combination of colors in the spectrum may be used. Preferably, the two colors selected are capable of being readily distinguished from each other for separation to support short and far focus functionality as further described herein.

With continuing reference to FIG. 1, first image sensor 50 in one embodiment may function as a short range focus image sensor for resolving or reading symbology target 90. Image sensor 50 preferably is a pixilated full array or area type sensor capable of capturing the entire symbology image at once. In some embodiments, image sensor 50 may be a CMOS or CCD such as for example a 1280×960 pixel CCD. Image sensor 50 is a generally flat and thin structure and includes a substantially planar active light receiving surface 51 which captures light energy incident on the surface reflected by Dichroic filter 70. Image sensor 50 includes circuitry 53 such as an integrated circuit and other electronics that are operative to convert and further process light energy received from the illuminated symbology into electrical signals representing a digitized image of the symbology. Circuitry 53 may be formed as part of a PCB (printed circuit board) to which sensor 50 is affixed. Area type sensors are versatile allowing for the capture of both 1D linear and 2D symbologies. In other embodiments depending on the application, however, sensor 50 may be a one-dimensional linear type sensor capable of capturing solely 1D symbologies such as conventional UPC barcodes.

In a preferred embodiments image sensor 50 is an off-axis sensor with respect to optical axis OA. Sensor 50 preferably is mounted on optical bench 80 of the scanner system 20 with an orientation generally parallel to optical axis OA such that light receiving surface 51 is also oriented parallel to the OA and facing in a direction towards Dichroic filter 70 as shown in FIG. 1. Image sensor 50 is preferably arranged and positioned in imaging scanner system 20 to receive light reflected (i.e. filtered) from Dichroic filter 70 as further described herein.

With continuing reference to FIG. 1, second image sensor 60 in one embodiment may function as a long range focus image sensor for resolving or reading symbology target 90. In one embodiment, image sensor 60 preferably is a pixilated full array or area type sensor similar to sensor 50 and capable of capturing the entire symbology image at once. In some embodiments, image sensor 60 may be a CCD or CMOS. In a preferred embodiments image sensor 60 is a 1280×960 pixel CCD. Image sensor 60 includes a substantially fat or planar active light receiving surface 61 which captures light energy incident on the surface and transmitted through Dichroic filter 70. Image sensor 60 includes circuitry 63 such as an integrated circuit that is operative to convert and further process light energy received from the illuminated symbology into electrical signal representing a digitized image of the symbology. Although in a preferred embodiment, image sensors 50, 60 are the same and preferably both are full array type sensors, in other embodiments either sensor 50, 60, or both may be a linear one-dimensional type sensor depending on the types of symbology intended to be read. Both image sensor circuitry 53, 63 may implement control logic to capture, resolve, and otherwise process captured symbology image information.

In a preferred embodiment, image sensor 60 is an on-axis sensor with respect to optical axis OA as shown. Sensor 60 is preferably mounted on the optical bench 80 of the scanning system 20 with an orientation generally perpendicular to optical axis OA such that light receiving surface 61 is also oriented perpendicular to the OA as shown in FIG. 1. Image sensor 60 is preferably arranged and positioned in imaging scanner system 20 to receive light transmitted through Dichroic filter 70 (i.e. unfiltered) as further described herein.

Since in the preferred embodiment lens assembly 30 is a fixed focus lens set, the ability to adjust the position of sensors 50 and 60 is provided to focus the blue and red light 54, 64 onto the sensors corresponding to predetermined short (or near) and long (or far) range focal points FPS and FPL respectively as shown in FIG. 1. Focal points FPS and FPL each define respective corresponding focal distances or lengths measured from the front of lens assembly 30 to each focal point. To allow for proper initial setup of imaging scanning system 20, therefore, adjustable sensor mounts 52, 62 are preferably provided on optical bench 80 that are operative to allow each sensor 50, 60 to be translated in and out (i.e., closer or farther) with respect to Dichroic filter 70 for adjusting and setting the Focus of the sensors. In the arrangement shown in FIG. 1, sensor 50 preferably may be translated in a direction generally perpendicular to optical axis OA with sensor mount 52 as shown by the directional arrow. Sensor 60 preferably may be translated in a direction generally along or parallel to optical axis OA with sensor mount 62 as shown by directional arrow. Once the focus of each sensor 50, 60 is established for local points S and L respectively, the sensors preferably are fixed in position to the optical bench 80 by any suitable means used in the art such as via adhesives, fasteners, etc. Sensors 50, 60 may be affixed to optical bench 80 either removably or permanently.

Figure 5:
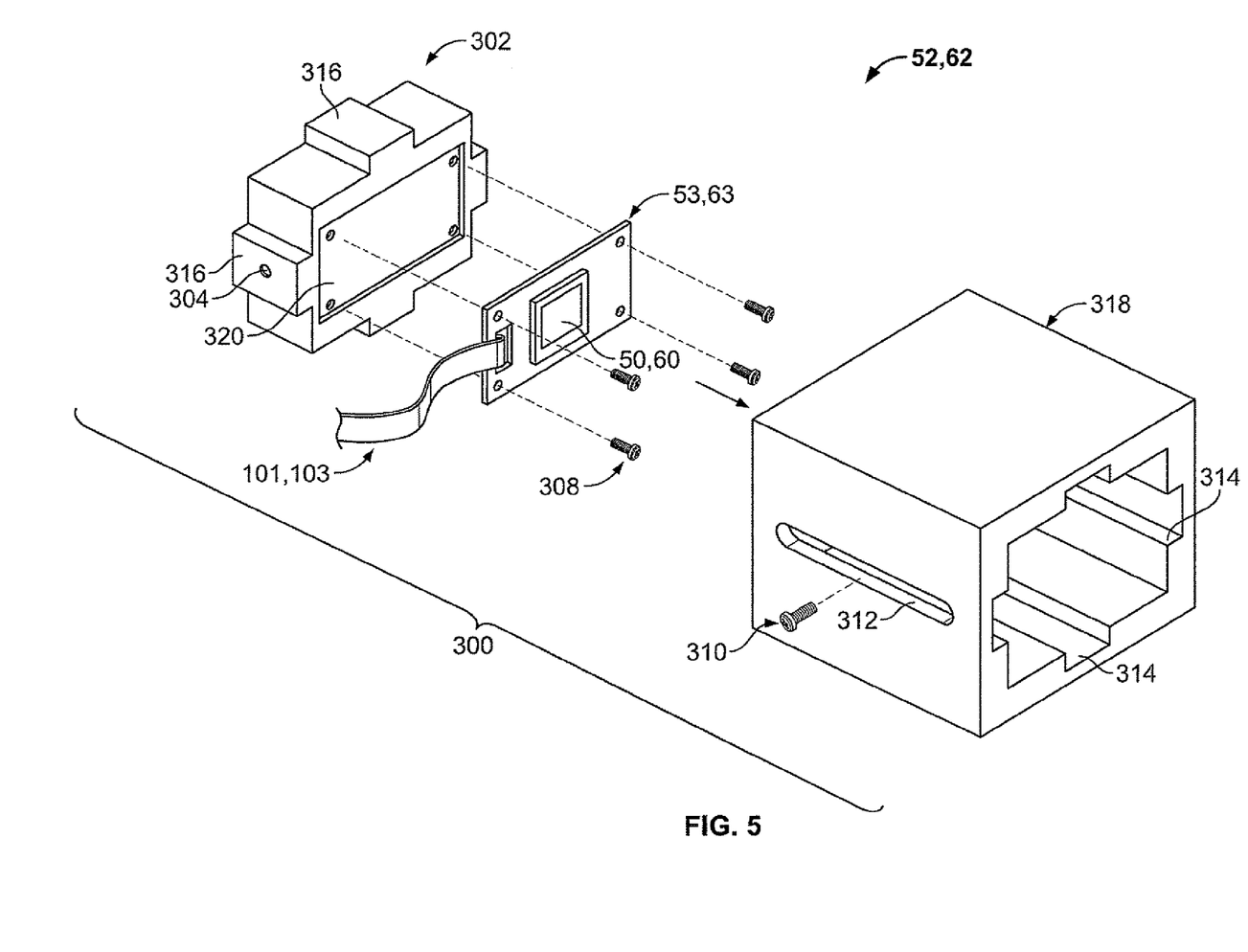
FIG. 5 is an exploded perspective view of an image sensor translation mechanism for mounting image sensors of the optical imaging scanner system of FIG. 1.

FIG. 5 illustrates one possible embodiment of an image sensor translation mechanism 300 that may be employed in the foregoing manner for adjustable sensor mounts 52, 62 to adjust and set the focus of image sensors 50, 60. Translation mechanism 300 in one possible embodiment includes a substantially hollow "yoke" or housing 318 mountable on optical bench 80 (see FIG. 1) and translation block 302 which is slidably receivable in the housing. Block 302 may include longitudinally-extending keys 316 which interact with keyways 314 inside housing 318 to guide insertion and movement of the block in the housing during adjustment of the image sensor focus, PCBs containing image sensor circuitry 53 or 63 may be mounted on a forward face 320 of translation block 302 via fasteners 308 or using an), other suitable method such as adhesives etc. The PCBs further include data communication links 101 or 103, which in some embodiments without limitation may be in the form of flexible ribbon cables as shown for making electrical connections to control circuit 100 as further described herein. In one embodiment, lens assembly 30 (see FIG. 1) and housing 318 may be first fixed to optical bench 80 by any suitable manner commonly known in the art. Translation block 302 may then be inserted into housing 318 and moved forwards and backwards until the desired focus is set for each image sensor 50, 60. In one possible embodiment, as shown in FIG. 5, at least one locking fastener 310 such as a set screw may then be inserted through a longitudinally-extending slot 312 in the housing 318 and engaged with a corresponding threaded locking hole 304 formed in at least one of the keys 316 to fix the translation block 302 (and concomitantly image sensors 50, 60) in position. Although one possible embodiment of an image sensor translation mechanism has been described, it will be appreciated that other suitable means may be used. Accordingly, the invention is not limited in this regard.

Referring to FIG. 1, imaging scanner system 20 in one embodiment further includes optional imaging control circuitry 100 associated with image sensors 50, 60 for processing light and image information received by the image sensors. Control circuitry 100 may include integrated circuits, microprocessors, memory, and various semiconductor devices, which in some embodiments may be incorporated into a printed circuit board (PCB). Control circuitry 100 is operative to receive electrical signals and data from image sensors 50, 60 representing image information captured and digitized by the sensors for scanned symbology target 90. In one embodiment, image sensors 50, 60 send signals to control circuit 100 via data communication links 101 and 103, which preferably may be two-way data communication paths allowing the exchange of signals and information between the control circuit and sensors. In some embodiments, this allows control circuit 100 to be configured to provide control signals back to image sensors 50, 60 via data communication links 101, 103. In other possible embodiments, sensor 50 may communicate with sensor 60 through control circuit 100 or directly (not shown).

Imaging control circuit 100 preferably includes and implements control logic, which preferably is operative to control the image capture process, operation of image sensors 50, 60, and perform other functions some of which are further described herein. Control signals may be routed back to image sensors 50, 60 and circuitry 53, 63 via two-way communication links 101, 103. The control logic may be implemented in hardware, firmware, software, or any combination thereof. Control circuitry 100 may be physically mounted on optical bench 80 or off the bench.

Imaging scanner system 20 may further include a downstream computer or microprocessor 102 linked to control circuitry 100 via two-way data communication link 105 for decoding the scanned symbology target 90 in a conventional manner as readily known to those skilled in the art. Accordingly, microprocessor 102 preferably includes and implements control logic operative to read and process electrical signals and information received from imaging control circuitry 100. Microprocessor 102 preferably has access to a computer-readable media or database 104, which contains information necessary to decode the scanned symbology. Microprocessor 102 may be disposed in the scanner housing or external to the housing depending on the scanner and decoding system configuration selected. In some embodiments microprocessor 102 by be incorporated into the same or a different PCB than imaging control circuitry 100. Microprocessor 102 may communicate back to and provide control signals to control circuitry 100 via communication link 105, and ultimately may communicate with sensors 50, 60 in some embodiments through control circuitry 100. In other embodiments, microprocessor 102 may communicate directly with sensors 50 and 60 (not shown).

The communication links described herein may be formed using any commercially available technology including physical conductors or wires, wireless, or a combination thereof. In addition, the circuits and control circuits described herein may implement control logic which may be programmed in a conventional manner.

Figure 2:
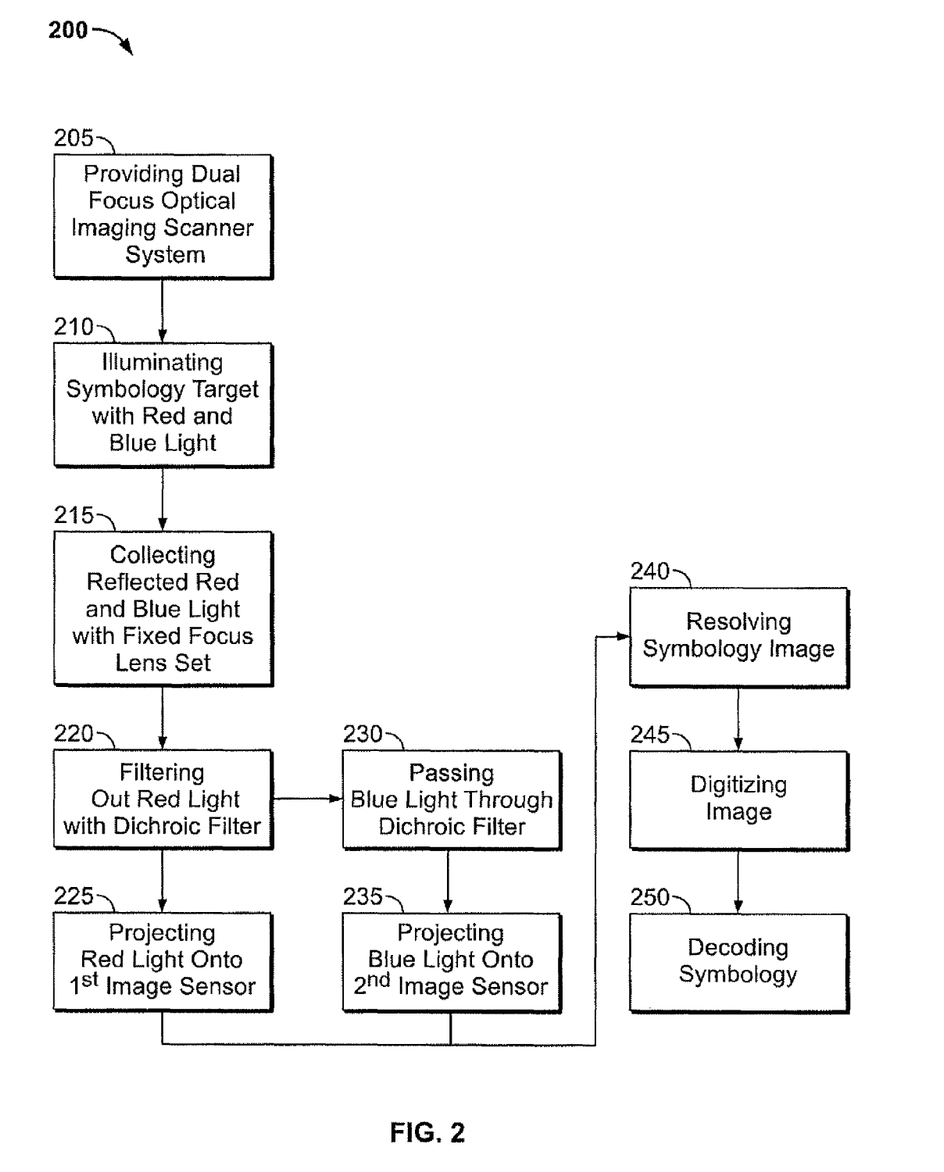
FIG. 2 is a schematic diagram of a preferred method of capturing a symbology using a fixed lens optical imaging scanner system.

The terms "circuitry" or "circuit" as used herein may refer to any combination of computer hardware, firmware, or software used to implement the control logic, and to process electrical, data, control, and power signals. The terms "circuitry" or "circuit" are used interchangeably herein A preferred method of using the fixed lens imaging scanner system 20 to capture a symbology image will now be described with reference to FIGS. 1 and 2. FIG. 2 schematically illustrates the method. In some possible embodiments, the symbology image preferably may be a 1D or 2D barcode. However, the system is not limited in its applicability to capturing barcode symbologies alone. Symbology target 90 may be emplaced on any type of object to be scanned.

The preferred method 200 includes providing a dual focus imaging scanner system 20 in step 205, which in some embodiments may be mounted in a portable handheld or stationary fixed mount barcode scanner or engine. Accordingly, in some embodiments scanner system 20 is sized and configured to be small enough to be mounted in the compact housing of a portable handheld barcode scanner. In other embodiments, however, scanner 20 may have a larger configuration such if incorporated into a fixed mount barcode scanner or engine. Imaging scanner system 20 preferably has been setup prior to use by adjusting the position of image sensors 50, 60 with adjustable sensor mounts 52, 62 as previously described herein to establish a long range focal point L and a short range focal point S with respect to the image sensors and preferably fixed lens assembly 30.

With continuing reference to FIGS. 1 and 2, the preferred method continues in step 210 by illuminating the target field 82 and symbology target 90 disposed therein with two different wavelengths of light from light sources 41 and 42. In one preferred embodiment, blue wavelength 64 and red wavelength 54 light may be used and are produced by light sources 41 and 42, respectively. However, other combinations of colors may be used. Blue and red light 64, 54 are both reflected from illuminated symbology target 90, creating a lighted image of target of the illuminated target that is comprised of both blue and red light 64, 54. In step 215 the method continues by collecting the dual wavelength symbology image (blue 64 and red 54 light) reflected from symbology target 90 with preferably fixed focus lens assembly 30. Lens assembly 30 defines an optical axis OA. The dual wavelength light 64, 54 image passes through lens assembly 30 is next projected onto and received by Dichroic filter 70. In step 220, the Dichroic filter 70 filters out red light 54 in a preferred embodiment with red reflect Dichroic filter 70, and projects the red light image of symbology target 90 onto first image sensor 50 (in step 225), which may be a short range focus sensor in one embodiment. In one possible embodiment, the red light 54 incident on the Dichroic filter may be reflected at 90 degrees perpendicular to optical axis OA to first image sensor 50. Simultaneously, the method includes passing blue light 64 through Dichroic filter 70 in step 230 and projecting the blue light unto second image sensor 60 (in step 235), which may be used as a long range focus sensor in one embodiment. In one possible embodiment, the blue light 64 incident on the Dichroic filter is transmitted through the filter along or parallel to optical axis OA to second image sensor 60.

Continuing with reference to FIGS. 1 and 2, the method continues in step 240 by resolving the symbology image preferably using the image sensor circuitry 53, 63 associated with each image sensors 50, 60. Depending on the particular scanning scenario encountered, as further explained herein, the symbology image received by sensors 50 and 60 may have sufficiently clarity such that either one of the sensors or both of the sensors may be capable of resolving the captured symbology image. In step 245, either image sensors 50 or 60, or both image sensors in some instances, digitize the resolved symbology image to create an output signal or two output signals (i.e. one from each sensor) representative of the symbology image. In alternate embodiments, control circuitry 100, which may optionally be provided to receives input signals from the sensors 50, 60 via communication links 101, 103 may also be operative to digitize the captured images and/or further process the digitized image signal or signals from sensors 50, 60. The digitized image is then transmitted to computer or microprocessor 102 which includes accessible and programmable computer readable medium or database 104 that contains reference information or data about the scanned symbology image. Database 104, in one embodiments preferably includes the information and data necessary to correlate and compare the scanned symbology image to a plurality of preprogrammed known symbology images in a conventional manner as readily known and within the capabilities of those skilled in the art. The method concludes in step 250 by decoding the read symbology image using microprocessor 102, which preferably includes and implements programmable control logic to assist in decoding and reading the symbology image. The symbology information may then be further analyzed and processed for use as input data into any number of computerized systems, such as for example without limitation, retails sales, inventory tracking, security authorization or access, etc.

Optical imaging scanner systems can usually resolve and hence decode a symbology target if it generally proximate to or near the focal point of the lens system within a given range of distances from the lens. This is attributable to the optical characteristics of lenses wherein a fixed focal point associated with a lens system will have an associated depth of field (DOF) which is defined as the distance in front of and behind the target where the target will still appear in focus. As the symbology target moves out of the DOF, its image will become blurred and cannot be resolved with sufficient clarity and detail by the image sensor to be read and decoded by the scanning system. Accordingly, image sensors 50, 60 each have an associated focal distance or "working" range measured from in the front of lens assembly 30 towards the target field 82 containing a symbology target 90. Therefore, the symbology target need not be precisely at the focal point of the lens system to be readable as long as the target is within the local distance or working range for a particular lens assembly. However, the focal distance range of known fixed lens systems is limited as previously discussed in the Background of the Invention Section.

An advantage provided by preferred dual focus imaging scanner system 20 with Fixed lens assembly 30 is that the combination of the dual wavelength lighting system 40 and dual light sensors 50, 60 expands the focal distance or working range of the system beyond the capabilities of a single focal length fixed lens system alone. Accordingly, the user need no longer choose between a short focal distance imaging system or a long focal distance system.

Figure 3:
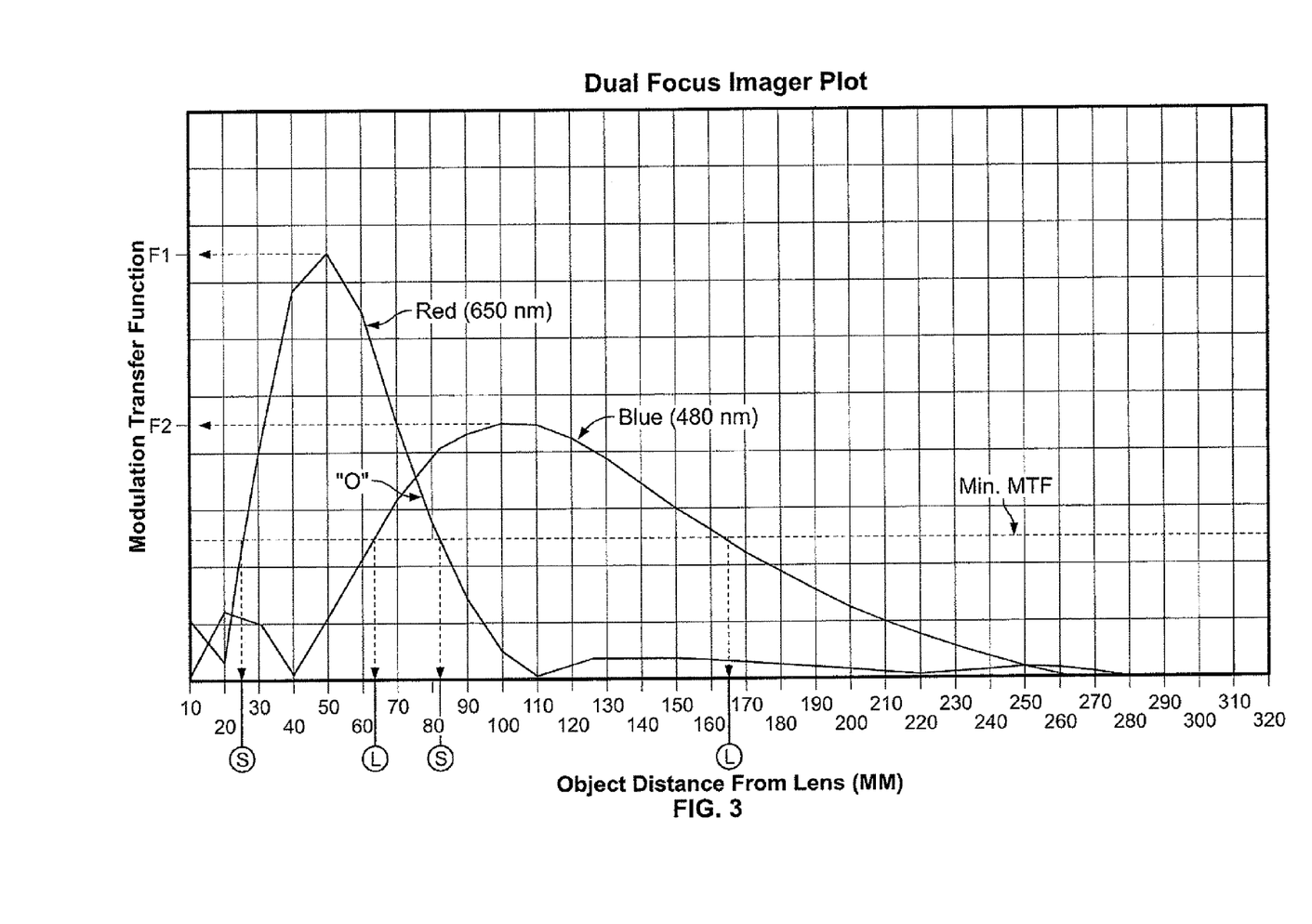
FIG. 3 is a graph showing the resolution performance of the fixed lens optical imaging scanner system according to FIG. 1.

Referring to FIG. 3, a graph is provided illustrating the expanded focal distance range and combined optical performance of dual focus imaging scanner system 20 for one exemplary 6 mil high density barcode scenario. FIG. 3 is a computer generated modeled graph of modulation transfer function (MTF) versus target or object (in lens engineering terminology) distance from lens assembly 30. As will be readily known to those skilled in the art, MTF is a quantifiable measure of optical resolution including a solid state digital imaging system's ability to resolve an image. MTF describes the response of the system to an image transformed into sine waves by the sensor. Generally, a minimum MTF in an image scanning system is dependent on and defined by the software used and represents the MTF required to resolve an image sufficiently to be read and decoded by a digital optical image scanning system. Accordingly, the minimum MTF required to resolve and decode a symbology image will vary with the particular image scanning system and software used therein.

With continuing reference to FIG. 3, the red light 54 curve depicts the performance of the short range focus portion of imaging scanner system 20, which in one embodiment may be used for capturing high density symbologies. The blue light 64 curve depicts the performance of the long range focus portion of imaging scanner system 20, which in one embodiment may be used for capturing lower density symbologies. Both these performance curves coexist within imaging scanner system 20 and advantageously enable the imaging system to resolve and decode both short range symbologies (e.g. high density or other) and long range symbologies.

As shown in FIG. 3, imaging scanner system 20 using red wavelength light 54 (about 650 nm) alone has an optimum resolution at an MTF of about "F1" at a distance of about 50 mm from lens assembly 30, with a focal distance or working range of about 25 mm to about 80 mm from the lens assembly in which symbology target 90 may be successfully resolved and decoded. Accordingly, a symbology target 90 at a distance from lens assembly 30 that falls outside the focal distance or working range of about 25-80 mm would not be resolved sufficiently to decode the target image making this a short distance range scanning lens setup if used alone. Imaging scanner system 20 using blue wavelength light 64 (about 480 nm) alone has all optimum resolution at an MTF of about "F2" at a distance of about 100 mm from lens assembly 30, with a focal distance or working range of about 65 mm to about 165 mm from the lens assembly in which symbology target 90 may be successfully resolved and decoded. Accordingly, a symbology target 90 at a distance from lens assembly 30 that falls outside the local distance or working range of about 65-165 mm would not be resolved sufficiently to decode the target image making this a long distance range scanning lens setup if used alone.

With continuing reference to FIG. 3, it will be seen that dual focus imaging scanner system 20 advantageously combines image resolution performance of both the short and long distance range lens system and has an expanded effective local distance or working range of about 25-165 mm, greater than either lens system working range alone. This gives advantageously the imaging scanner system the benefits of both short and long range focal distances and symbology scanning capabilities.

Whether symbology target 90 is resolved by image sensor 50 or 60 and decoded depends on the distance of the target from lens assembly 30. If the distance of symbology target 90 from lens assembly 30 falls within the foregoing short focal distance range associated with the red light 54 curve in FIG. 3, then image sensor 50 will resolve the symbology image. If the distance of target 90 from lens assembly 30 falls within the foregoing long focal distance range associated with the blue light 64 curve, then image sensor 60 will resolve the symbology image. In the event neither sensor 50 or 60 can resolve the symbology image, then target 90 likely is either closer or farther from lens assembly 30 than the focal distance range of imaging scanner system 30 (i.e. less than or greater than about 25-165 mm). In such a case, the distance between lens assembly 30 and symbology target 90 may be adjusted by the user by either moving the target (e.g., for fixed mount scanners) or the scanner (e.g., for handheld scanners) until the image is resolved and decoded.

Figure 4:
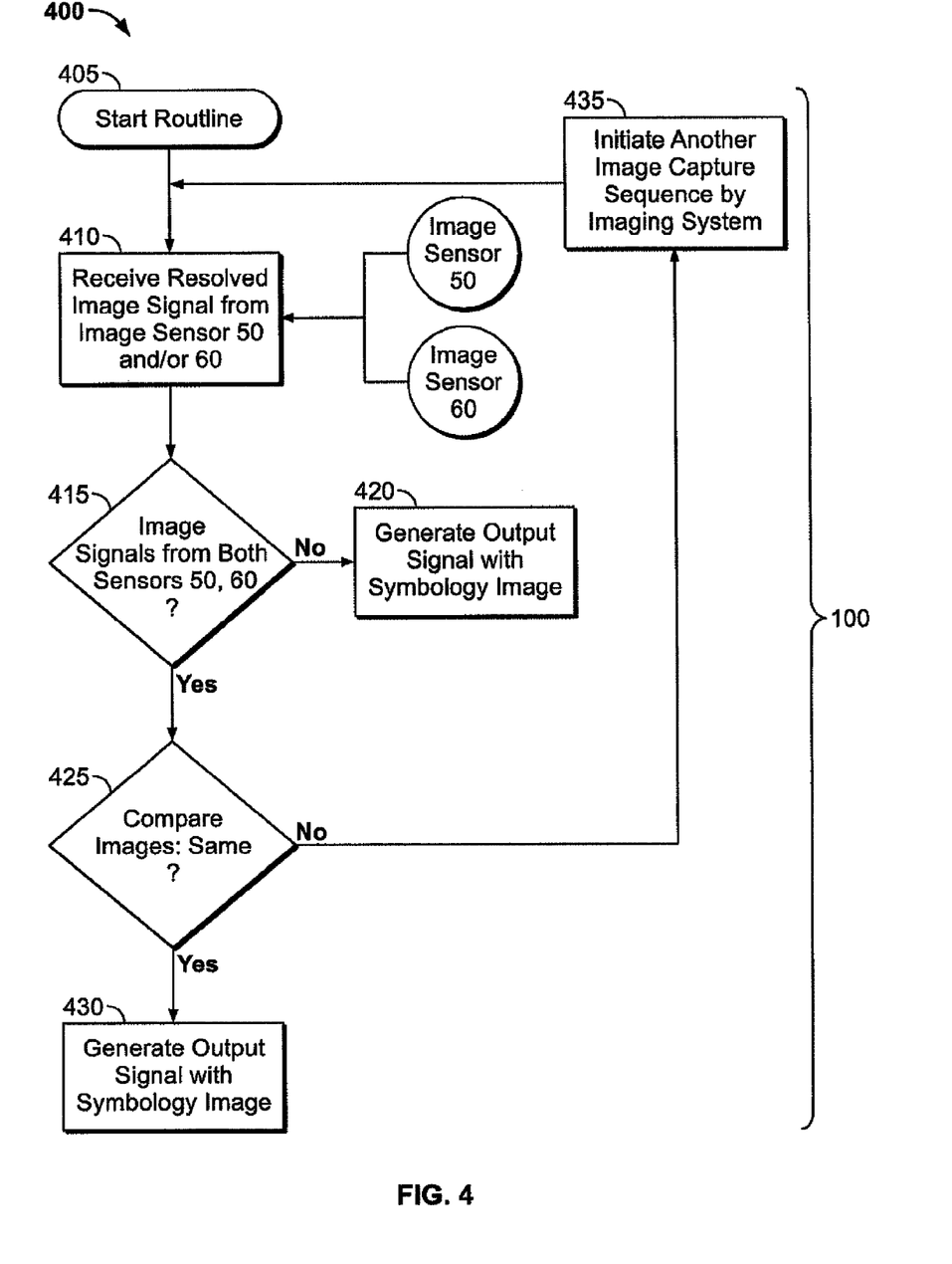
FIG. 4 is a flowchart showing exemplary control logic for operating a fixed lens optical imaging scanner system.

With reference to FIG. 3, it will be noted that one possible scenario may be encountered wherein the distance of symbology target 90 from lens assembly 30 falls into the overlap region "O" of the red and blue light performance curves from about 65-82 mm. In this case, the illuminated symbology target image focused clearly enough on both image sensors 50 and 60 simultaneously so that each sensor resolves and captures the image. According to another aspect of the invention therefore, control logic implemented by control circuitry 100 as shown in FIG. 4 may be provided to avoid errors in reading the symbology target where two images are simultaneously resolved by the image sensors. The control logic preferably is operative to minimize inaccuracies in decoding the symbology target image and confirm that interpretation of the symbology is consistent between both image sensors 50 and 60.

A method 200 for imaging a symbology with an imaging scanner system having both short and long focal range capabilities according to principles of the present invention will now be described with reference to FIGS. 1 and 2. Starting with step 205 in FIG. 2, a dual focus imaging scanner system such as the preferred embodiment 20 shown in FIG. 1 and described herein in detail is provided. For convenience of description only, the dual discrete illumination light sources will be assumed to produce red and blue wavelengths of light as these colors are readily separate and distinguishable. However, it will be appreciated that any other two discrete wavelengths or colors of light may be used provided they may be effectively separated. In step 210, a symbology target 90 is illuminated with red and blue light. Preferably, symbology target 90 is illuminated simultaneously with red and blue light. The dual wavelength or color light striking the symbology target is reflected and produces an image of the target that is comprised of and combines both the red and blue light. In step 215, a lighted symbology image of the illuminated symbology target comprised of both colors is collected. In one embodiment, the dual color symbology image is preferably collected with a fixed focus lens set or assembly 30.

Continuing with reference to FIGS. 1 and 2, the dual color symbology image collected in step 215 passes through lens assembly 30 and then strikes Dichroic color filter 70, which separates the image into a first symbology image comprised of red wavelength light and a second symbology image comprised of blue wavelength light. In one possible embodiment, with reference to step 220, Dichroic filter 70 filters out the first or red symbology image which is reflected from the filter, and projected onto and received by a first image sensor 50 in step 225. Simultaneously, in a preferred embodiment, Dichroic filter 70 passes or transmits the second or blue symbology image through the filter in step 230, which is projected onto and received by a second image sensor 60 in step 235. Preferably, the first image sensor has a first focal distance range and the second image sensor has a second local range different than the first focal range. In step 240, at least one of the first or second symbology images is resolved by the first or second image sensors 50, 60, which digitizes the symbology image and generates a signal representative of the image. In step 250, the digitized image signal is processed by microprocessor 102 and decoded to complete the read the symbology target 90.

Exemplary control logic for operating imaging scanner system 20 in general and performing a symbology, confirmation or check in the case of dual image capture is shown in FIG. 4. The control logic preferably is implemented by and preprogrammed into imaging control circuitry 100 in a preferred embodiment and/or microprocessor 102 in other embodiments. The control logic may be implemented in hardware, software, firmware, or any combination thereof.

Referring to FIG. 4, control logic process 400 begins in step 405 in which the routine is started. In step 410, a single signal or dual signals are received by imaging control circuitry 100 from either image sensors 50 or 60, or both. The signals contain digitized information representing the image of symbology target 90 images as captured and resolved by image sensors 50 and 60. In step 415, a test is performed to determine whether a single signal or two signals have been received by control circuitry 100. If a single signal is detected from either image sensor 50 or 60 (i.e. a "No" response is returned), control passes to step 420 in which an output signal with the digitized symbology image is generated and routed to microprocessor 102 for decoding. This represents a normal symbology read situation where the symbology target 90 image is near focal points S or L and is capable of being resolved by only one of two image sensors 50, 60.

If a signal is detected in step 415 from both image sensors 50 and 60 (i.e. a "Yes" response is returned), control passes to step 425 as shown in FIG. 4. This may represent a symbology read situation where the distance of the symbology target 90 from lens assembly 30 is in the overlap region "O" of FIG. 3 as described previously herein, and both image sensors 50, 60 read and resolve the symbology image. To perform an integrity check which confirms whether the image read is accurate, a test is performed in step 425 to compare both digitized images in the signals from image sensors 50 and 60. If the images are the same (i.e. a "Yes" response is returned), the image read is presumed accurate and control passes to step 430 in which an output signal with the digitized symbology image is generated and routed to microprocessor 102 for decoding. In one embodiment, the control logic may select one of the two digitized images from image sensors 50, 60 to generate the output signal in step 430. If the image comparison in step 425 determines that the images in signals from image sensors 50 and 60 are different (i.e. presumed inaccurate), control passes to step 435 which initiates another image capture of symbology target 90. Control then returns to logic step 410 and the logic control sequence continues as previously described. In the event the test in step 425 again fails to confirm an accurate image read, control will pass to step 435 and the control sequence will again be repeated. This control loop may continue numerous times. However, if imaging scanner system 20 cannot not decode symbology target 90, the failed read will usually prompt a user to adjust the distance of symbology target 90 in relation to lens assembly 30. This will eventually result in reading and decoding the target by either (1) the target moving into the focal distance range of a single sensor 50 or 60 resulting in only one sensor reading the target, or (2) both sensor digitized images being the same if a dual read occurs. Either of the foregoing two scenarios will result in generating an output signal to microprocessor 100 for decoding the scanned image.

While the foregoing description and drawings represent preferred or exemplary embodiments of the present invention, it will be understood that various additions, modifications and substitutions may be made therein without departing from the spirit and scope of the present invention as defined in the accompanying claims. One skilled in the art will appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

What is claimed is:

1. A dual focus optical imaging scanner system having two different focal points along a working range, for reading near and far symbology images of a symbology target along said working range, said dual focus optical imaging scanner system comprising:
    a first light source producing a first discrete wavelength of light for illuminating a symbology target;
    a second light source producing a second discrete wavelength of light for illuminating the symbology target;
    a lens assembly for collecting a combined reflected image of the illuminated symbology target comprising the first and second discrete wavelengths of light;
    a color separation filter positioned to receive the combined reflected image of the symbology target collected by the lens assembly, wherein said color seperation filter is operative to produce a first symbology image comprising the first discrete wavelength of light and a separate second symbology image comprising the second discrete wavelength of light;
    a first image sensor for receiving the first symbology image comprising the first wavelength of light from the filter and having an associated first focal point; and
    a second image sensor for receiving the second symbology image comprising the second wavelength of light from the filter and having an associated second focal point different than the first focal point;
    wherein the two different focal points along said working range enable the capturing of near and far symbology images of said symbology target along said working range.

2. The dual focus imaging scanner system of claim 1, wherein the color separation filter is a Dichroic filter.

3. The dual focus imaging scanner system of claim 1, wherein the first discrete wavelength of light corresponds to blue light, and the second discrete wavelength of light corresponds to red light.

4. The dual focus imaging scanner system of claim 1, wherein the first image sensor has a first focal distance range, and the second image sensor has a second focal distance range that overlaps the first focal distance range.

5. The dual focus imaging scanner system of claim 1, wherein the color separation reflects the first symbology image from the filter to the first image sensor and transmits the second symbology image through the filter to the second image sensor.

6. The dual focus imaging scanner system of claim 5, wherein the second image sensor is positioned along an optical axis defined by the lens assembly and the first image sensor is positioned off of the optical axis.

7. The dual focus imaging scanner system of claim 5, further comprising imaging control circuitry associated with the first and second image sensors, wherein the imaging control circuitry is operative to receive digitized symbology images of the symbology target from the first and second image sensors.

8. The dual focus imaging seamier system of claim 1, further comprising control logic implemented by imaging control circuitry and being operative to select one of the first or second images for decoding the symbology image of the symbology target.

9. The dual focus imaging scanner system of claim 8, further comprising a microprocessor communicating with the imaging control circuitry for decoding the symbology image of the symbology target.

10. A dual focus optical imaging scanner system having a working distance for reading near and far symbologies along said working distance, said dual focus optical imaging scanner system comprising:
    a dual wavelength light source producing discrete first and second wavelengths of light for illuminating a symbology target;
    a fixed lens assembly for collecting a symbology image reflected from the illuminated target comprising the first and second wavelengths of light, and the lens assembly defining an optical axis; and
    a color separation filter positioned along the optical axis to receive the symbology image from the lens assembly, wherein said color separation filter is oriented at an angle to the optical axis and being operative to: (1) reflect a first symbology image comprising the first wavelength of light from said color separation filter to an off-axis image sensor, and to (2) transmit a second symbology image comprising the second wavelength of light through said color separation filter to an on-axis image sensor; and
    wherein the off-axis and on-axis image sensors have different focal lengths for capturing near and far symbology images along said working range.

11. The dual focus imaging scanner system of claim 10, wherein the off-axis image sensor has a substantially planar active light receiving surface aligned parallel to the optical axis.

12. The dual focus imaging scanner system of claim 11, wherein the on-axis image sensor has a substantially planar active light receiving surface aligned perpendicular to the optical axis.

13. The dual focus imaging scanner system of claim 10, wherein the color separation filter is a Dichroic filter.

14. The dual focus imaging scanner system of claim 10, wherein the on-axis image sensor has a first focal distance range and the off-axis image sensor has a second focal distance range that overlaps the first focal distance range.

15. The dual focus imaging scanner system of claim 10, further comprising imaging control circuitry associated with the image sensors, wherein the control circuitry is operative to receive separate digitized images of the symbology produced by each of the image sensors and to select one of the images for decoding the symbology.

16. A method for resolving a symbology with an imaging scanner system comprising:
(a) illuminating a symbology with two discrete wavelengths of light;
(b) collecting an image of the illuminated symbology comprising the two discrete wavelengths of light;
(c) separating the collected image into a first symbology image comprising the first discrete wavelength of light and a second symbology image comprising the second discrete wavelength of light;
(d) receiving the first symbology image on a first image sensor having a first focal range;
(e) receiving the second symbology image on a second image sensor having a second focal range different than the first focal range; and
(f) resolving at least one of the first or second symbology images for decoding the symbology graphically represented in said first or second symbology images.

17. The method of claim 16, further comprising the steps of transmitting the first symbology image along an optical axis to the first image sensor and directing the second symbology image at an angle to the optical axis, to the second image sensor.

18. The method of claim 16, wherein step (c) is performed with a Dichroic color filter.

19. The method of claim 16, wherein step (b) is performed with a lens assembly.

20. The method of claim 16, wherein step (f) further comprises resolving, both of the first and second symbology images.

21. The method of claim 16, wherein step (f) further comprises decoding at least one of the first or second resolved symbology images by comparing the image to preprogrammed images stored in a computer-readable medium.

* * * * *